US008127430B2

(12) United States Patent
Moriguchi et al.

(10) Patent No.: US 8,127,430 B2
(45) Date of Patent: Mar. 6, 2012

(54) METHOD OF ASSEMBLING SPLIT CORE TYPE STATOR OF INNER ROTOR TYPE ROTARY ELECTRIC MACHINE

(75) Inventors: Keigo Moriguchi, Takahama (JP); Toshiaki Oohara, Okazaki (JP)

(73) Assignee: Denso Corporation, Kariya (JP)

( * ) Notice: Subject to any disclaimer, the term of this patent is extended or adjusted under 35 U.S.C. 154(b) by 7 days.

(21) Appl. No.: 12/863,492

(22) PCT Filed: Apr. 2, 2009

(86) PCT No.: PCT/JP2009/056856
§ 371 (c)(1),
(2), (4) Date: Jul. 19, 2010

(87) PCT Pub. No.: WO2009/125706
PCT Pub. Date: Oct. 15, 2009

(65) Prior Publication Data
US 2010/0293778 A1    Nov. 25, 2010

(30) Foreign Application Priority Data

Apr. 7, 2008    (JP) .................................. 2008-099237

(51) Int. Cl.
*H02K 15/00*    (2006.01)

(52) U.S. Cl. ..................... 29/596; 29/606; 310/216.007; 310/216.009

(58) Field of Classification Search .................... 29/596, 29/606; 310/216.007–216.009
See application file for complete search history.

(56) References Cited

U.S. PATENT DOCUMENTS

| 1,756,672 | A | * | 4/1930 | Barr ........................ 310/216.078 |
| 5,786,651 | A | * | 7/1998 | Suzuki ................... 310/216.009 |
| 6,140,735 | A | * | 10/2000 | Kato et al. .................... 310/201 |
| 6,219,900 | B1 | | 4/2001 | Suzuki |
| 6,922,001 | B2 | * | 7/2005 | Neet et al. ..................... 310/215 |

(Continued)

FOREIGN PATENT DOCUMENTS

JP    09-9534    1/1997

(Continued)

OTHER PUBLICATIONS

International Search Report for PCT/JP2009/056856, mailed Jun. 23, 2009.

(Continued)

*Primary Examiner* — A. Dexter Tugbang
*Assistant Examiner* — Jeffrey T Carley
(74) *Attorney, Agent, or Firm* — Nixon & Vanderhye PC

(57) ABSTRACT

A method of manufacturing a stator coil including shaping a plurality of shaped bodies from electric conductor wires; combining the shaped bodies to form a combined body; and winding the combined body around a core member to form a wound body. The shaped body includes a plurality of parallel straight portions extending along a longitudinal direction of the combined body, and a plurality of turn portions connecting straight portions at ends of the straight portions in an alternating manner. Each of the shaped bodies includes a plurality of straight overlap sections. The wound body includes a plurality of straight laminated sections formed from the plurality of straight overlap sections laminated in a radial direction. Pre-orientation members are inserted respectively into consecutive clearances formed between adjacent straight overlap sections during the winding step, so overlap of the straight portions in the straight overlap section caught between said pre-orientation members is aligned.

6 Claims, 13 Drawing Sheets

U.S. PATENT DOCUMENTS

| | | | |
|---|---|---|---|
| 2001/0004799 A1 | 6/2001 | Suzuki | |
| 2004/0207282 A1 | 10/2004 | Ueda et al. | |
| 2007/0180682 A1 | 8/2007 | Ueda et al. | |
| 2008/0093948 A1* | 4/2008 | Naganawa | 310/203 |
| 2009/0026872 A1* | 1/2009 | Tomohara et al. | 310/216 |
| 2009/0261685 A1* | 10/2009 | Akimoto et al. | 310/207 |

FOREIGN PATENT DOCUMENTS

| | | | |
|---|---|---|---|
| JP | 09-233773 | | 9/1997 |
| JP | 2000-139048 | | 5/2000 |
| JP | 2002-141230 | | 5/2002 |
| JP | 20030110978 | * | 4/2003 |
| JP | 2003-235187 | | 8/2003 |
| JP | 2004-320886 | | 11/2004 |

OTHER PUBLICATIONS

International Preliminary Report on Patentability and Written Opinion for PCT/JP2009/056856, dated Oct. 12, 2010, with English translation, 11 pages.

* cited by examiner

[FIG. 1]
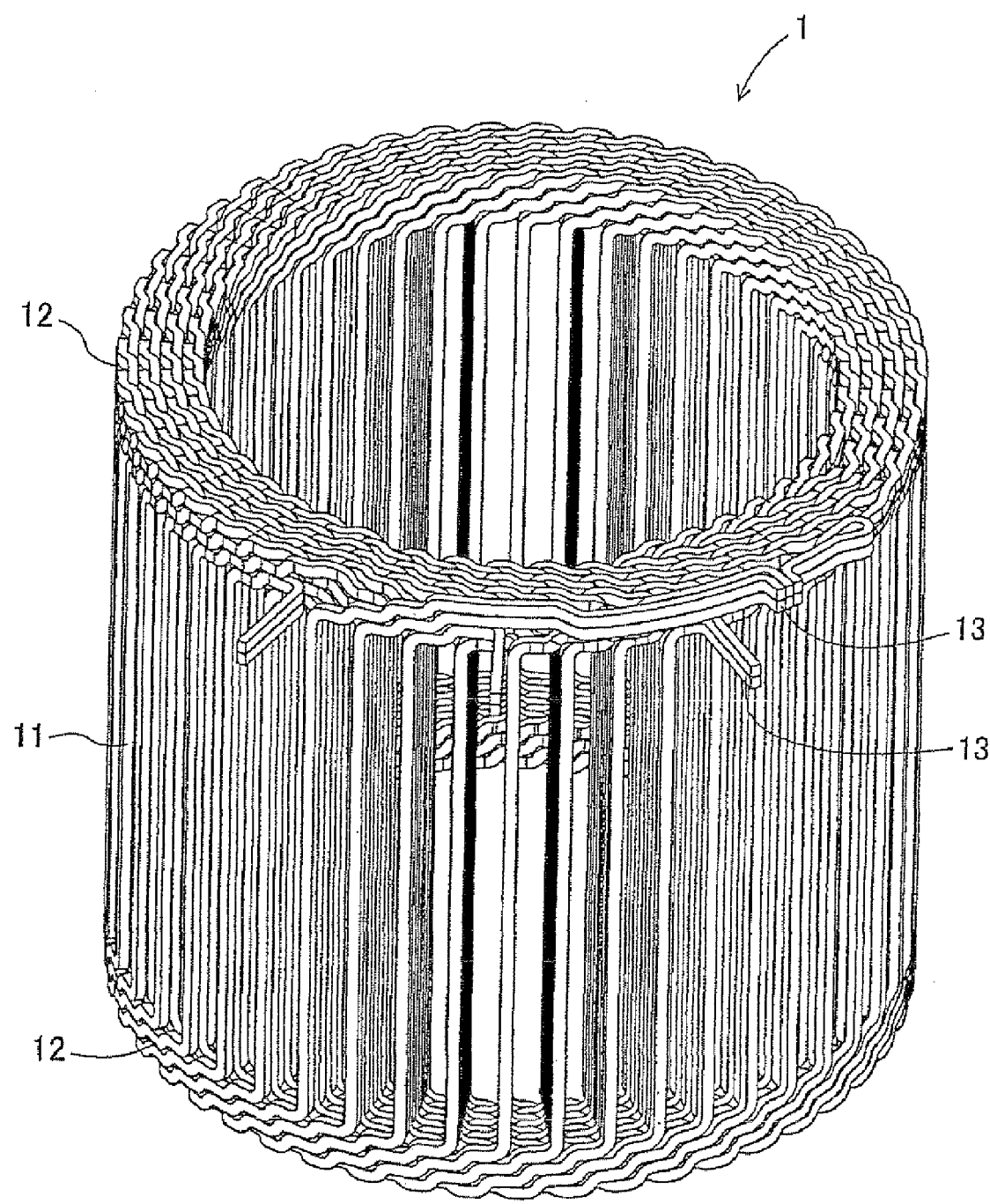

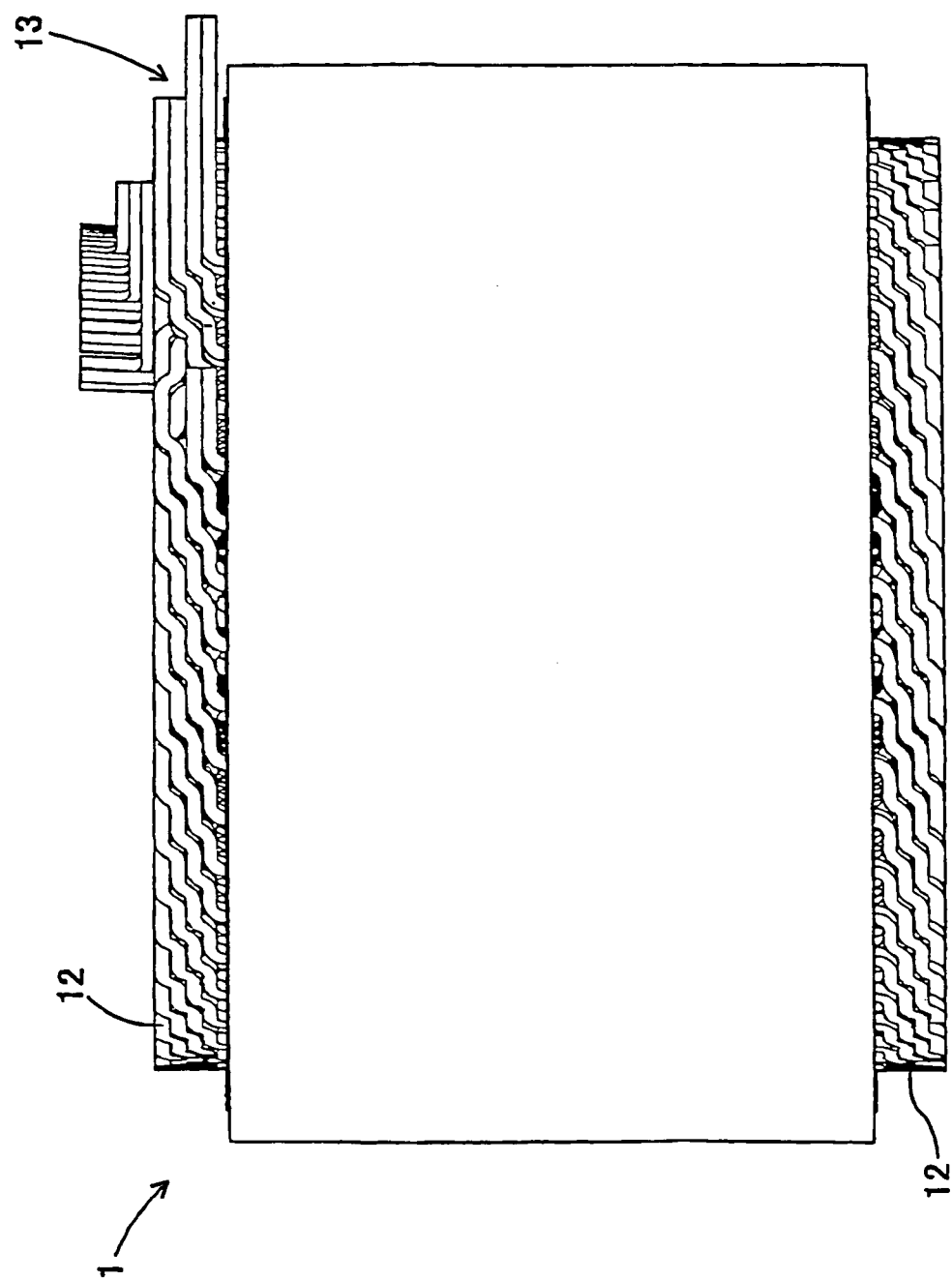
[FIG. 2]

[FIG. 3]
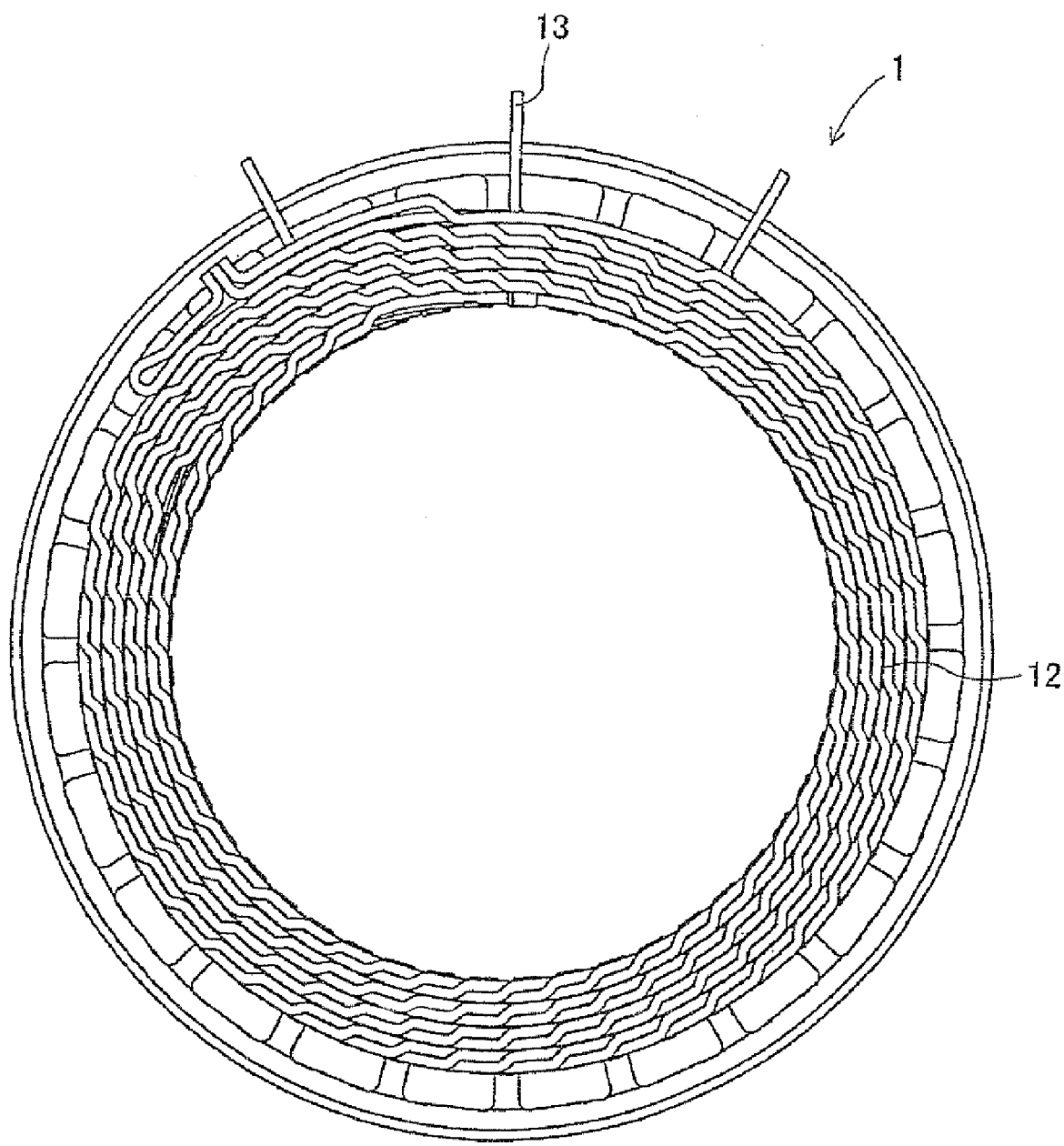

[FIG. 4]
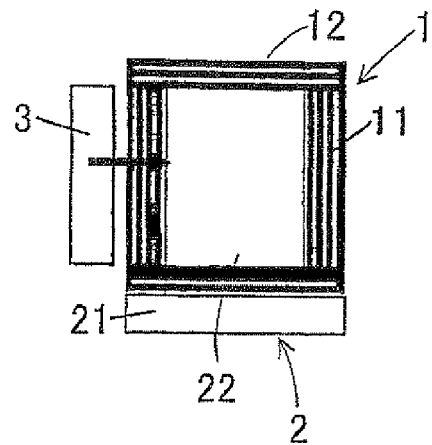
[FIG. 5]
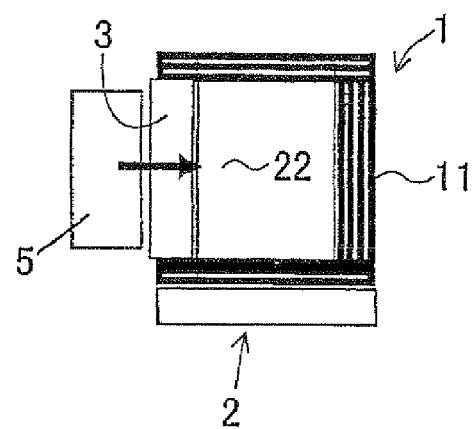
[FIG. 6]
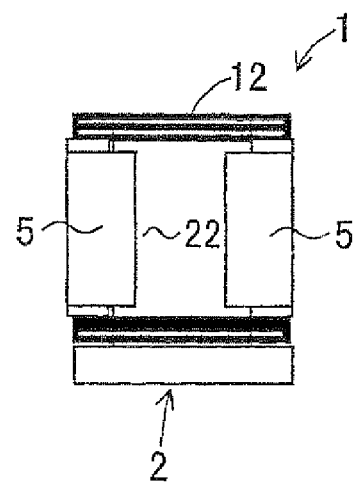

[FIG. 7]
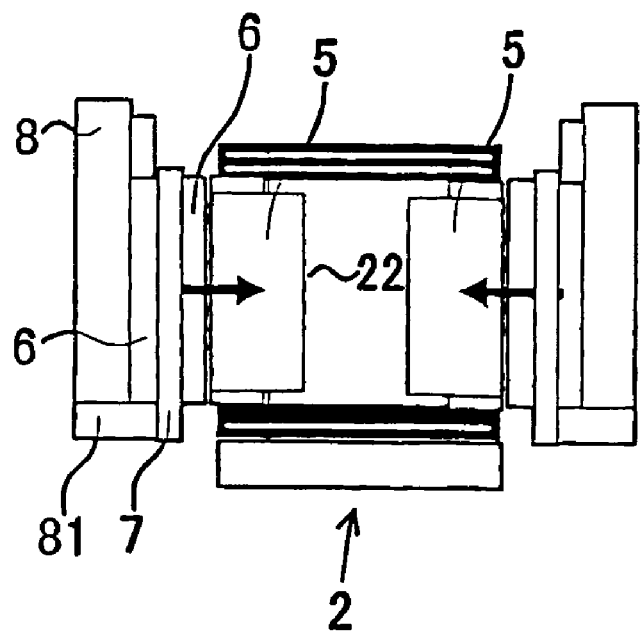
[FIG. 8]
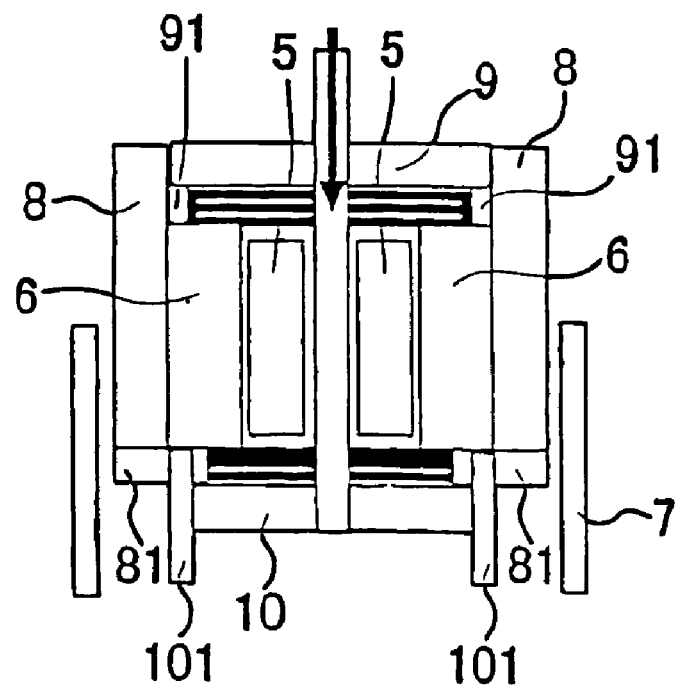

[FIG. 9]
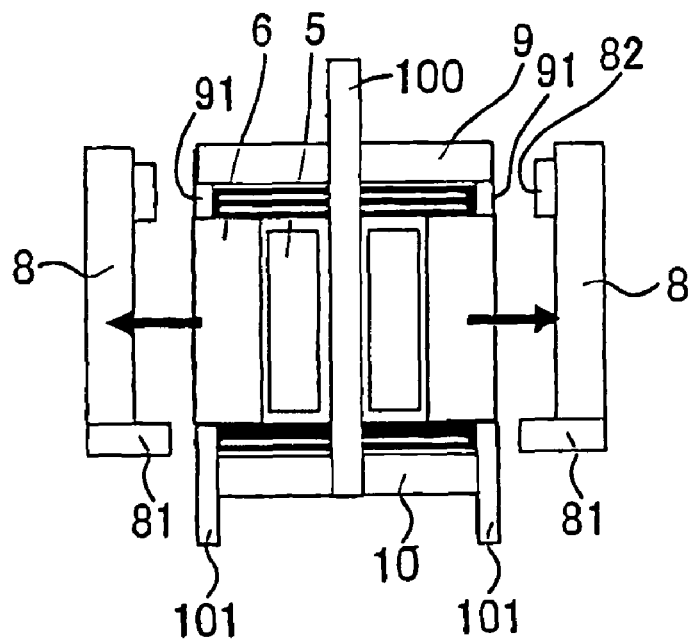
[FIG. 10]
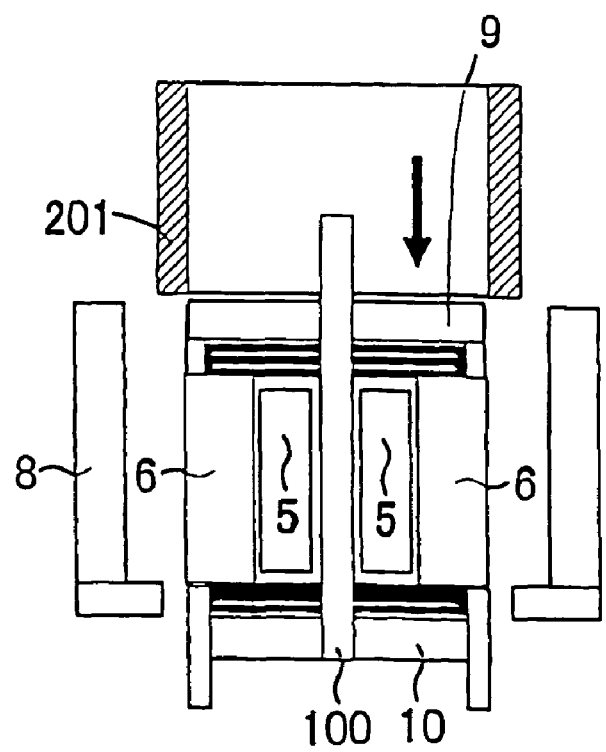

[FIG. 11]
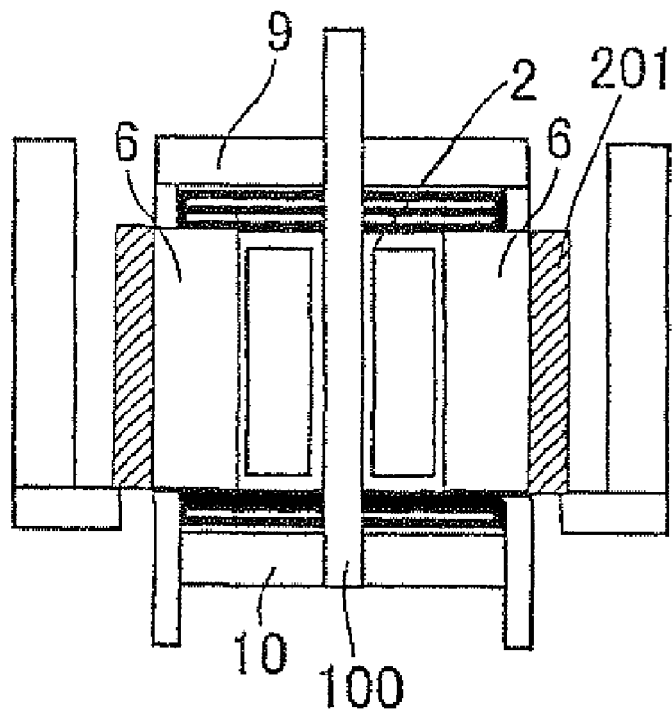
[FIG. 12]
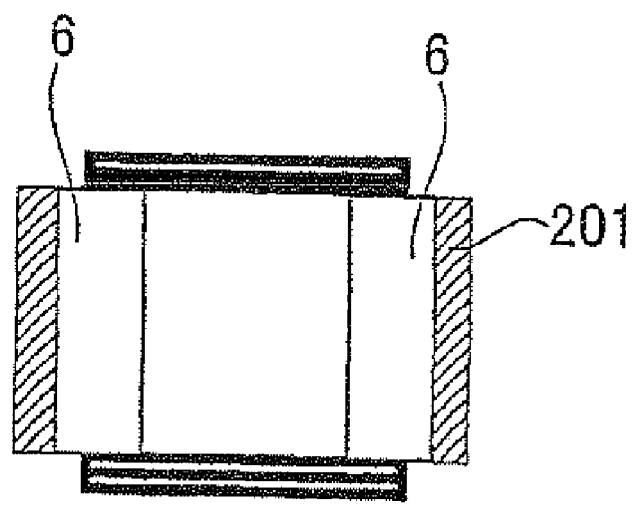

[FIG. 13]
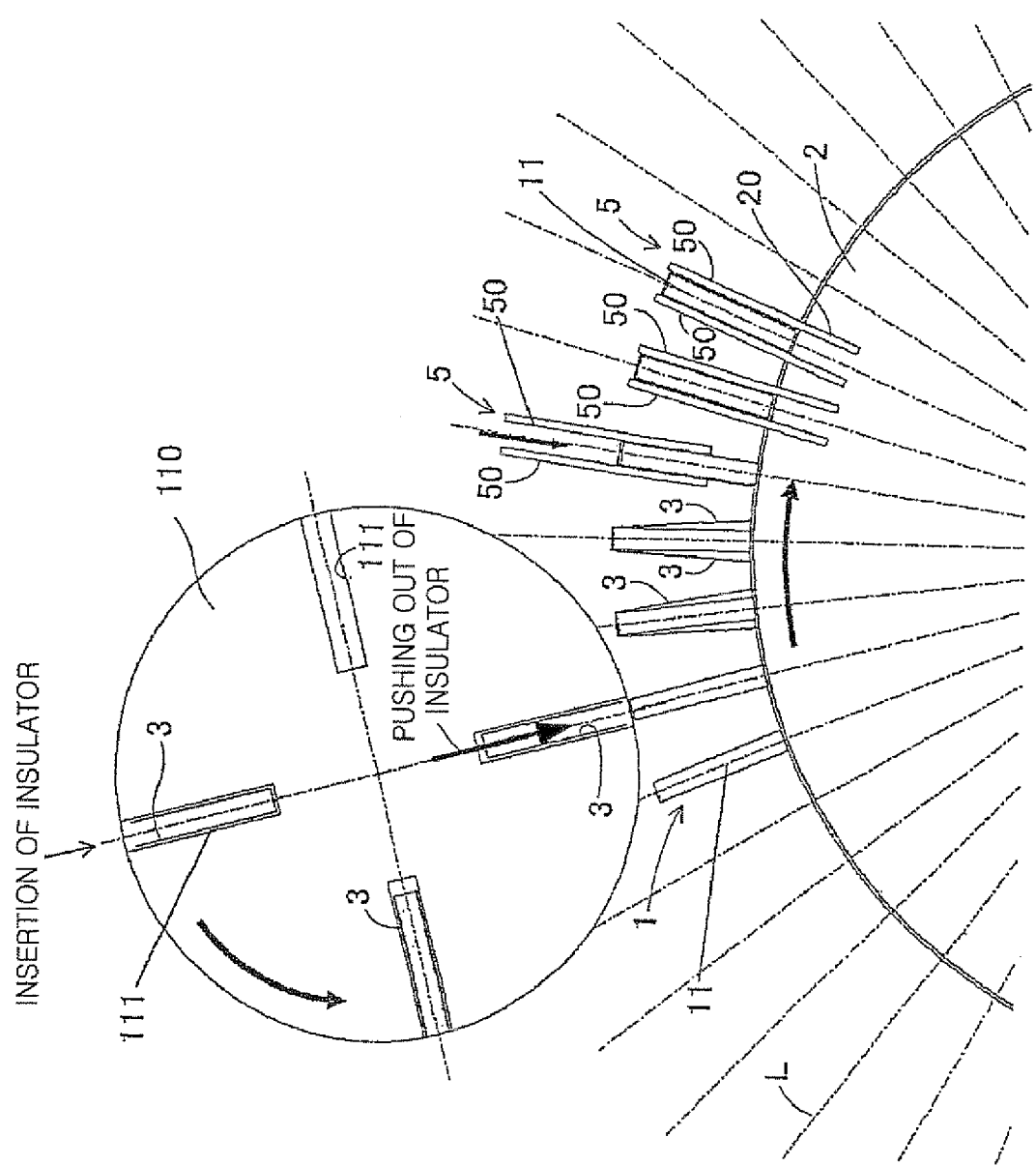

[FIG. 14]
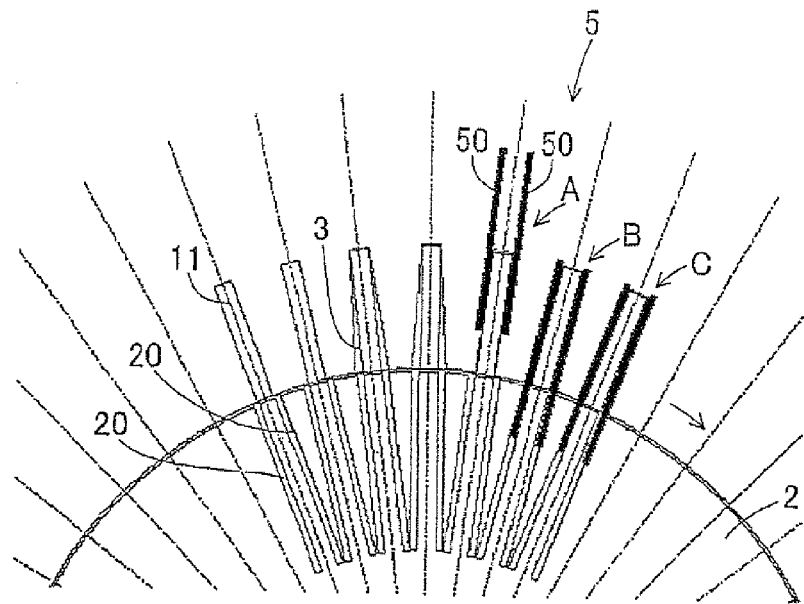
[FIG. 15]
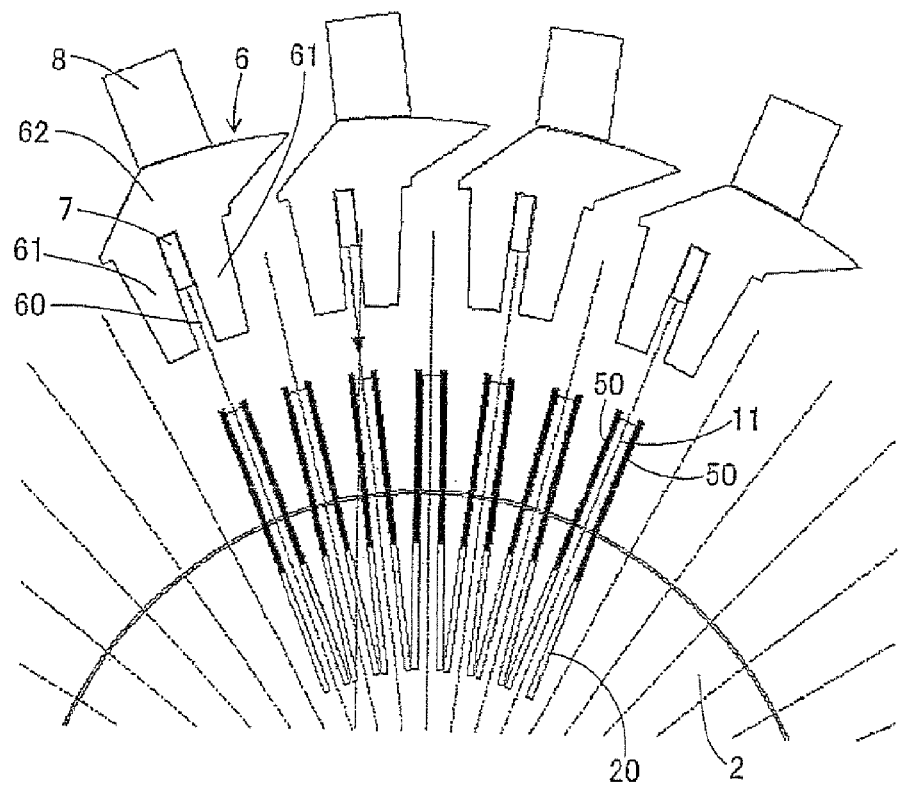

[FIG. 16]
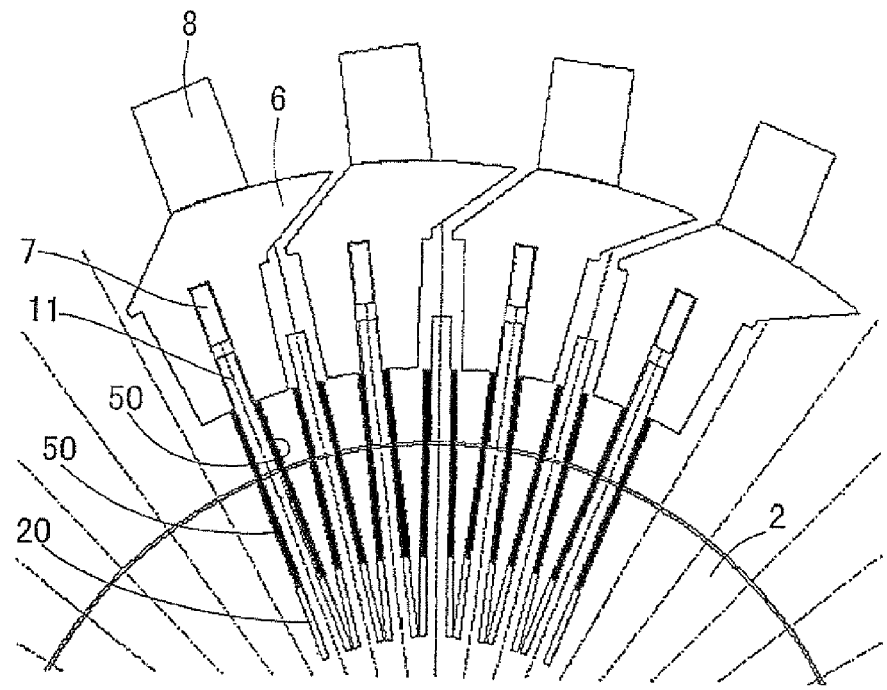
[FIG. 17]
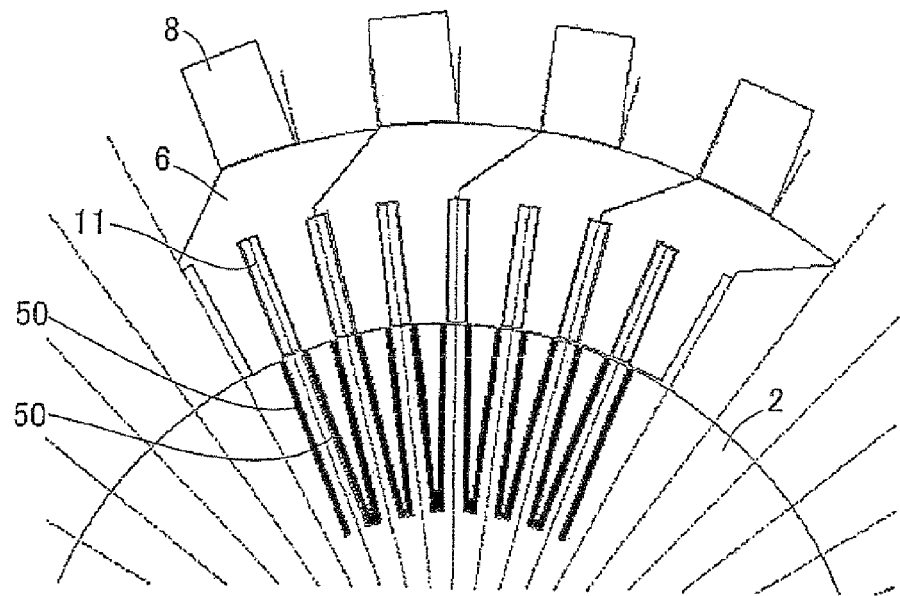

[FIG. 18]
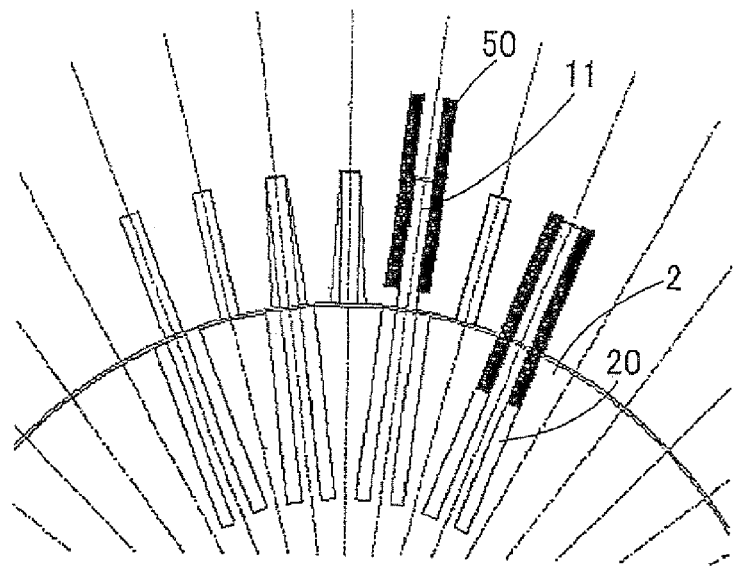
[FIG. 19]
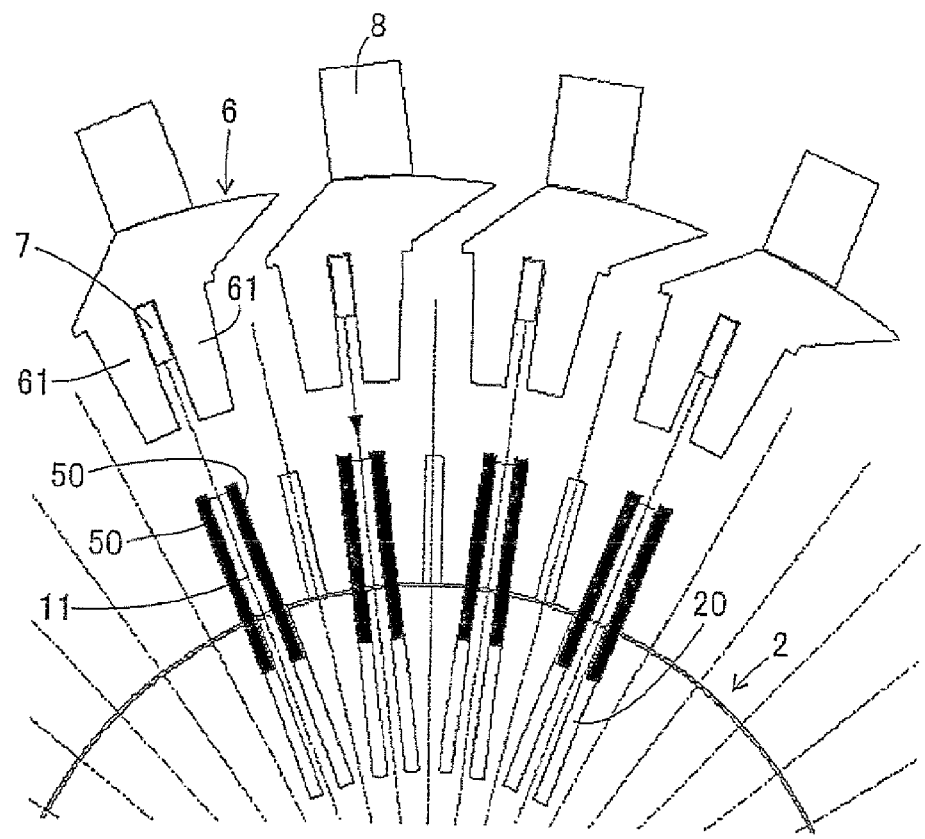

[FIG. 20]
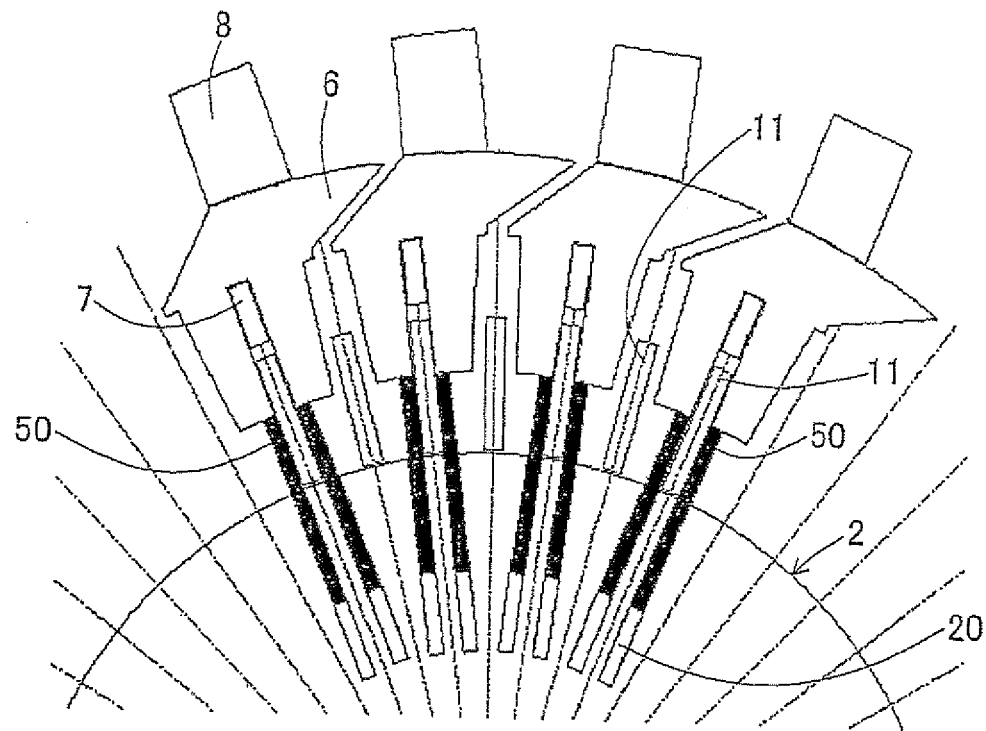
[FIG. 21]
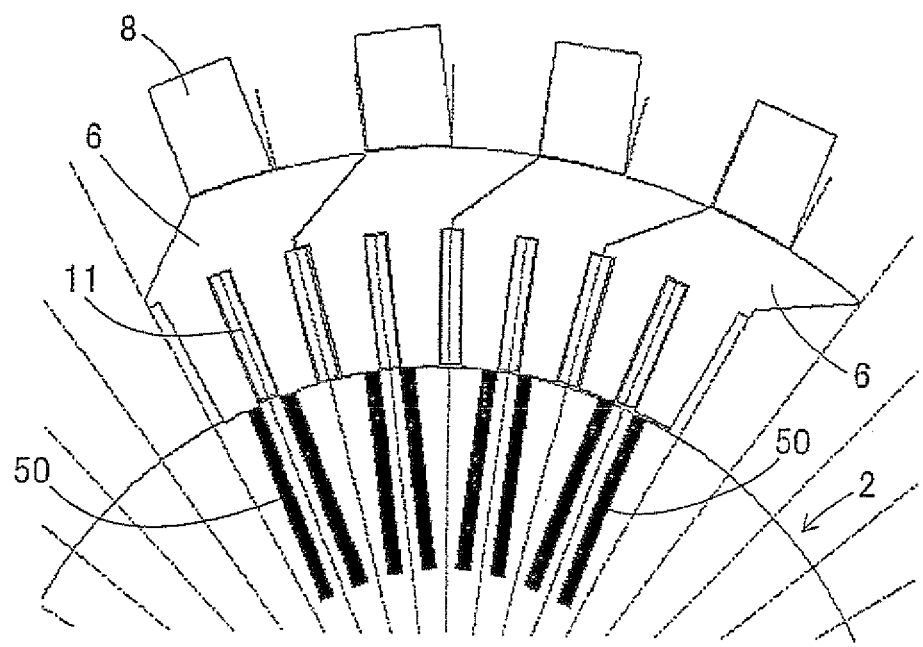

[FIG. 22]
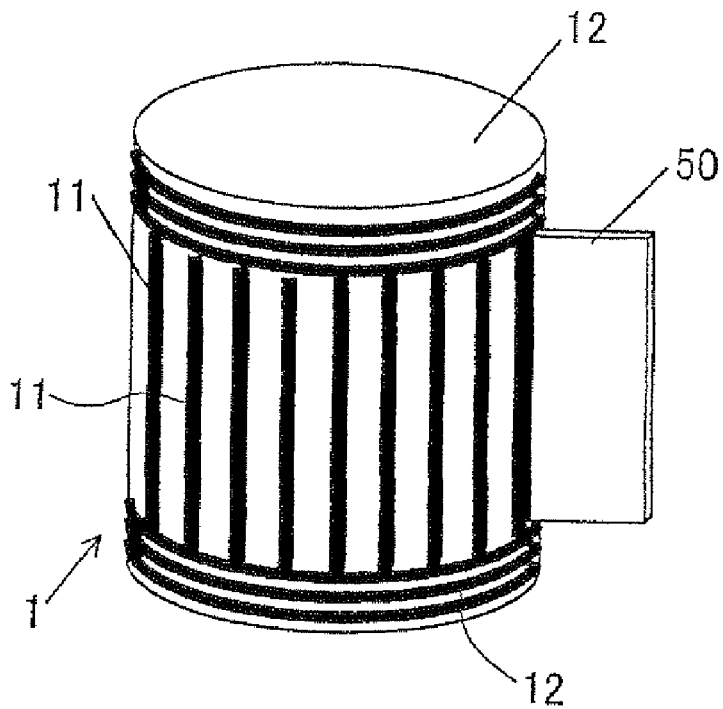
[FIG. 23]
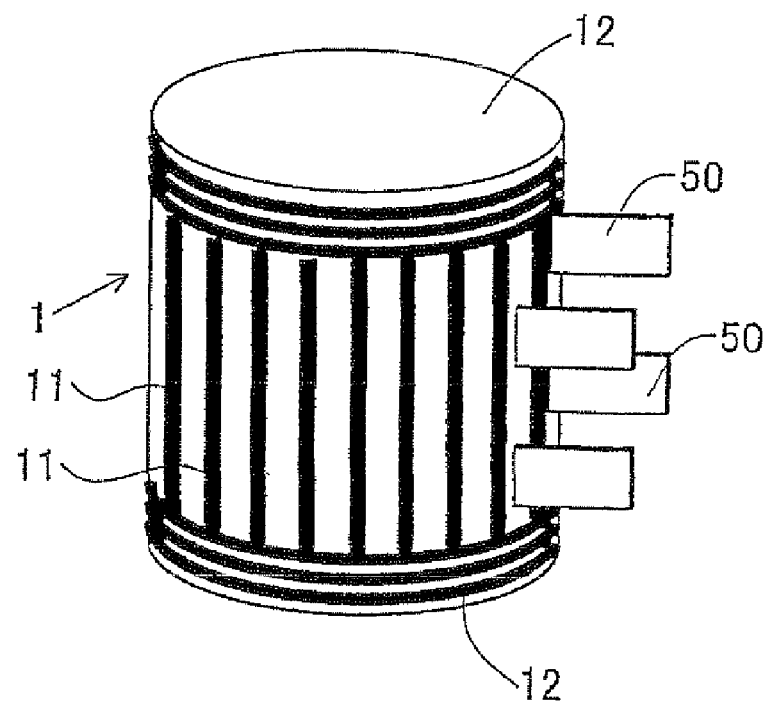

METHOD OF ASSEMBLING SPLIT CORE TYPE STATOR OF INNER ROTOR TYPE ROTARY ELECTRIC MACHINE

This application is the U.S. national phase of International Application No. PCT/JP2009/056856 filed 2 Apr. 2009 which designated the U.S. and claims priority to JP Patent Application No. 2008-099237 filed 7 Apr. 2008, the entire contents of each of which are hereby incorporated by reference.

BACKGROUND OF THE INVENTION

1. Technical Field

The present invention relates to a method of assembling a split core type stator of an inner rotor type rotary electric machine.

2. Background Art

In recent years, split core type stators manufactured by assembling split cores into a stator of an inner rotor type rotary electric machine described, for example, in the following Patent documents 1 and 2 have been put to practical use because they facilitate the work to insert in-slot conductor portions of a stator coil into slots of a stator core and improve the slot lamination factor, although it has a problem of reduction of stator rigidity.

Patent document 1: Japanese Patent Application Laid-open No. 2002-141230

Patent document 2: Japanese Patent Application Laid-open No. 2003-235187

BRIEF DESCRIPTION OF THE INVENTION

However, it is common that conventional split core type stators use a concentrated winding stator coil which is very easy to wind, and it is less common that a distributed winding coil is wound on the split cores. Particularly, in the case of the distributed winding coil using electric wires having a large cross-sectional area, the work to wind a multi-phase coil around the respective slots of the split cores is difficult because of the difficulty of bending deformation of the electric wires, and even if it is possible, it results that the coil ends bulge to a large extent.

Accordingly, it may occur that in the case of using such electric wires having a large cross-sectional area, the stator coil is made in a cylindrical shape in advance in order to facilitate inserting the teeth of the split cores between two circumferentially adjacent ones of the in-slot conductor portions of the cylindrical coil. The cylindrical coil mentioned here may be one having a partially cylindrical shape other than the one having a completely cylindrical shape. Further, in-slot conductor portions mentioned here refer to conductor portions of a stator coil to be accommodated in the slots of a stator core.

However, since the circumferential width of the respective in-slot portions of the cylindrical coil is formed to be approximately the same as the circumferential width of the slots of the split cores to increase the slot lamination factor, when each of the in-slot conductor portions includes a plurality of electric wires arranged along the circumferential direction, the electric wires may be unevenly disposed along the circumferential direction. Hence, since inserting the in-slot conductor portions of the cylindrical coil into the slots of the split cores requires skilled work, it has been difficult to automate this. In addition, there was a possibility that the insulating coat resin film of the in-slot conductor portion is damaged if the in-slot conductor portion is squeezed into the slot.

The present invention has been made in view of the above problem, and its object is to provide a method of assembling a split core type stator of an inner rotor type rotary electric machine, in which in-slot conductor portions of a stator core fabricated in advance through distributed winding can be accommodated with ease in the slots of the respective split cores.

The present invention to solve the above problem comprises:

a coil preparing step of preparing a stator coil made of a distributed winding coil in which a number of in-slot conductor portions to be accommodated in slots of a stator are arranged at a predetermined circumferential pitch at a position of a predetermined radial distance from an axis center;

a split core disposing step of radially disposing a number of split cores each having at least one slot radially outside the respective in-slot conductor portions of the stator coil;

a teeth inserting step of inserting teeth of the split cores between each adjacent in-slot conductor portions by moving a number of the split cores to a centripetal direction; and a split core joining step of joining a number of the split cores to constitute a stator core;

wherein the teeth inserting step includes a step of supporting the in-slot conductor portions movable relatively in a radial direction by a plurality of conductor holders displaceable in the radial direction before the split cores are moved to the centripetal direction, while holding a plurality of the in-slot conductor portions at their respective target circumferential slot positions, and then moving the plurality of the conductor holders to the centripetal direction in conjunction with movement of the split cores to the centripetal direction.

That is, in this invention, the in-slot conductor portions of the distributed winding coil fabricated in advance are held relatively displaceably in the radial direction by the conductor holders, and the circumferential positions of the conductor holders are set such that the circumferential positions of the in-slot conductor portions coincide with the circumferential positions of the split cores.

By doing so, it is possible to restrict the in-slot conductor portions of the distributed winding coil from deviating with respect to the slots of the split cores in the circumferential direction by the conductor holders, at the time of insertion of the in-slot conductor portions into the slots of the split core, that is, at the time of insertion of teeth of the split cores to circumferential both sides of the in-slot conductor portions. By this, the in-slot conductor portions can be smoothly accommodated in the slots. Further, in this embodiment, these plural in-slot conductor portions can be smoothly accommodated in succession in the slots also in the case where a plurality of the in-slot conductor portions are arranged in the radial direction in one slot position, because the conductor holders are moved to the centripetal direction in conjunction with the movement to the centripetal direction of the split cores.

After all, according to this invention, it is possible to perform the accommodation step of the in-slot conductor portions into the slots reliably and easily, which has been the most difficult work in the step of winding the distributed winding coil fabricated in advance around the split cores.

In a preferred embodiment, the split core includes two teeth facing to each other across one slot, and a back yoke portion magnetically connecting the two teeth. By doing so, by the movement to the centripetal direction of the respective split cores, it is possible that into all the slots, all the in-slot conductor portions of the distributed winding coil can be inserted.

In a preferred embodiment, the conductor holders hold the circumferential width of the in-slot conductor portions below the circumferential width of the split cores at the target circumferential slot positions. By this, also in the case where the in-slot conductor portion to be accommodated in one slot is constituted of a plurality of electric wires in the circumferential direction, since the electric wires do not bulge in the circumferential direction to protrude in the circumferential direction with respect to the slot openings, insertion of the in-slot conductor portions into the slots can be carried out more smoothly.

In a preferred embodiment, the conductor holders are prepared in advance by a pair of conductor guide planks being apart from each other by nearly a slot width and extending in substantially the radial direction, and a drum-like holder supporting member having guide grooves to retractably hold the pair of the conductor guide planks constituting the plurality of the conductor holders at an outer periphery portion, the coil preparing step including a step to set the stator coil at the outer periphery portion of the holder supporting member, and to interpose the in-slot conductor portions between each pair of the conductor guide planks.

That is, according to this embodiment, since the conductor holder is constituted of the pair of the conductor guide planks which are plate-like members extending in the slot-extending direction (substantially the axial direction) and the radial direction disposed being apart by a predetermined interval in the circumferential direction, and the radially inner sides of the pair of the conductor guide planks are held in the guide grooves provided in the outer periphery portion of the drum-like holder supporting member movably in centripetal direction, alignment of the in-slot conductor portions along the circumferential direction can be achieved easily.

Incidentally, the conductor guide planks may be inserted into the guide grooves of the drum-like holder supporting member from radially outside the in-slot conductor portions, after the respective in-slot conductor portions of the distributed winding coil are disposed cylindrically radially outside the drum-like holder supporting member.

Further, the conductor guide planks may be displaced radially outwardly after the respective in-slot conductor portions are disposed radially outside the drum-like holder supporting member while the conductor guide planks are accommodated in the guide grooves of the outer periphery portion of the drum-like holder supporting member.

Incidentally, the above distributed winding coil may be a stator coil of a final shape, or may be a part thereof. The distributed winding coil may be formed by rounding a circumferentially developed coil. It is obvious that the distributed winding coil may be a wave-wound coil, a lap-wound coil, a full pitch coil, or a short pitch coil.

In a preferred embodiment, the conductor holders regulate the circumferential positions of the circumferentially odd numbered in-slot conductor portions of the stator coil, and do not regulate the circumferential positions of the circumferentially even numbered in-slot conductor portions of the stator coil. In this manner, the structure and drive control of the apparatus can be simplified.

In a preferred embodiment, the axial length of the conductor holders is shorter than the axial length of the in-slot conductor portions of the stator coil. In this manner, the apparatus can be simplified.

BRIEF EXPLANATION OF THE DRAWINGS

FIG. 1 is perspective views of stator coils used in Embodiments 1 to 3.

FIG. 2 is a plan view of a stator wound with the stator coil of FIG. 1.

FIG. 3 is a front view of the stator of FIG. 2.

FIG. 4 is a schematic view showing a stator assembling step of Embodiment 1.

FIG. 5 is a schematic view showing the stator assembling step of Embodiment 1.

FIG. 6 is a schematic view showing the stator assembling step of Embodiment 1.

FIG. 7 is a schematic view showing the stator assembling step of Embodiment 1.

FIG. 8 is a schematic view showing the stator assembling step of Embodiment 1.

FIG. 9 is a schematic view showing the stator assembling step of Embodiment 1.

FIG. 10 is a schematic view showing the stator assembling step of Embodiment 1.

FIG. 11 is a schematic view showing the stator assembling step of Embodiment 1.

FIG. 12 is a schematic view showing the stator assembling step of Embodiment 1.

FIG. 13 is a schematic view showing details of an inserting step of insulators and conductor holders in Embodiment 1.

FIG. 14 is a schematic view showing details of an inserting step of the conductor holders in Embodiment 1.

FIG. 15 is a schematic view showing details of the inserting step of the conductor holders in Embodiment 1.

FIG. 16 is a schematic view showing details of the inserting step of the conductor holders in Embodiment 1.

FIG. 17 is a schematic view showing details of the inserting step of the conductor holders in Embodiment 1.

FIG. 18 is a schematic view showing details of an inserting step of the conductor holders in Embodiment 2.

FIG. 19 is a schematic view showing details of the inserting step of the conductor holders in Embodiment 2.

FIG. 20 is a schematic view showing details of the inserting step of the conductor holders in Embodiment 2.

FIG. 21 is a schematic view showing details of the inserting step of the conductor holders in Embodiment 2.

FIG. 22 is a schematic perspective view showing conductor guide planks in Embodiments 1 and 2.

FIG. 23 is a schematic perspective view showing conductor guide planks in Embodiment 3.

BEST MODE FOR CARRYING OUT THE INVENTION

Preferred methods of assembling a distributing winding coil to a split core type stator core of an inner rotor type rotary electric machine of the invention are explained with reference to the drawings.

Embodiment 1

Explanation of a Distributed Winding Stator Coil

First, explanation is made to a distributed winding stator coil with reference to FIGS. 1 to 3. FIG. 1 is its perspective view, FIG. 2 is a plan view of a stator having this distributed winding stator coil, and FIG. 3 is a front view of the stator of FIG. 2. The distributed winding stator coil 1, which is a stator coil formed in an interlaced drum shape, is constituted of a number of in-slot conductor portions 11 extending in the axial direction at a constant circumferential pitch, and coil end conductor portions 12 extending in the circumferential direction and connecting both ends of the in-slot conductor portions 11. Reference number 13 denotes a terminal of the stator coil 1. Incidentally, although the distributed winding stator coil 1 constitutes the entire circumference of the stator coil in FIGS. 1 to 3, it is not limited thereto. For example, it may have a partially cylindrical shape such as semicircle.

(Explanation of a Stator Assembling Step)

Next, an entire step to insert split cores into this distributed winding stator coil 1 is explained with reference to FIGS. 4 to 12 are schematic axial cross-sectional views. In each of the Figs., reference number 2 denotes a holder supporting member, and reference number 3 denotes an insulator. In each of the Figs., the distributed winding stator coil 1 is shown by its cross section being indicated by heavy lines.

(Explanation of FIG. 4)

First, the same number of insulators 3 as the number of in-slot conductor portions 11 are prepared, and the respective insulators 3 are disposed to cover the respective in-slot conductor portions 11 from its radially outer side individually.

In FIG. 4, the holder supporting member 2 is constituted of a pedestal portion 21, and a drum portion 22 having a slightly smaller diameter and standing from the pedestal portion 21. The drum portion 22 of the holder supporting member 2 is inserted inside the distributed winding stator coil 1 interlaced in a cylindrical shape and disposed coaxially with the distributed winding stator coil 1. Incidentally, the insulator 3 is a member caused to cover the in-slot conductor portion 11 of the distributed winding stator coil 1 to electrically insulate the in-slot conductor portion 11 from the stator core in the slot, the insulator 3 having a U-shaped long groove opening to the radially inner side in which the in-slot conductor portion 11 is accommodated.

(Explanation of FIGS. 5 and 6)

Next, the in-slot conductor portions 11 covered with the insulator 3 are respectively covered with the conductor holder 5 from its radially outer side. FIG. 5 shows a state in which one conductor holder 5 is fitted into the holder supporting member 2, and FIG. 6 shows a state in which all the conductor holders 5 are fitted into the holder supporting member 2.

In FIGS. 5 and 6, the conductor holders 5, which are members to regulate the circumferential positions of the respective in-slot conductor portions 11, are moved to the centripetal direction while circumferentially adjoining the in-slot conductor portions 11, and fitted into not shown guide grooves recessed from the outer periphery of the holder supporting member 2 at a predetermined circumferential pitch. Incidentally, this guide groove is formed deep to accommodate substantially the entire radial width of the plate-like conductor holder 5.

(Explanation of FIG. 7)

Next, a number of the split cores 6 are disposed radially outside the distributed winding stator coil 1, and moved to the centripetal direction. The respective split cores 6 sit radially outside the distributed winding stator coil 1, and disposed along the entire circumference of the distributed winding stator coil 1. By this, each teeth of each split core 6 is inserted between two circumferentially adjacent ones of the in-slot conductor portions 11 individually. By this, all the in-slot conductor portions 11 are inserted into the respective slots individually.

In FIG. 7, 7 denotes a core alignment plank to regulate circumferential deviation between each respective split cores 6, and 8 denotes a core inserting jig to move each split core 6 to the centripetal direction. The core inserting jig 8 includes a core receiving member 81 projecting radially inwardly to prevent each split core 6 from falling at its bottom end. The core alignment planks 7 penetrate through the slots of the split cores 6.

(Explanation of FIG. 8)

Next, after the core alignment planks 7 are removed, and the core inserting jigs 8 are further pushed in, the respective split cores 6 disposed substantially cylindrically are temporarily held in the axial direction by a pair of plate-like core temporarily holding jigs 9 and 10.

The plate-like core temporarily holding jigs 9 and 10 are disk-like members located axially outside the coil end conductor portions 12 of the distributed winding coil 1.

The plate-like core temporarily holding jigs 9 and 10 include core holding members 91 and 101 which project radially inwardly and contact the end surfaces of the respective split cores 6 at their front ends. The respective split cores 6 are temporarily held by pressing the respective split cores 6 at a predetermined pressure by the core temporarily holding jigs 9 and 10. Reference number 100 denotes a pin inserted into a through hole formed to penetrate in the axial direction at the radial center of the core temporarily holding jigs 9 and 10.

(Explanation of FIG. 9)

Next, the core inserting jigs 8 are removed radially outwardly.

(Explanation of FIGS. 10 and 11)

Next, a soft magnetic outer casing 201 making a cylindrical back yoke is inserted in the axial direction so as to be in contact with the outer peripherals of the respective split cores 6 disposed cylindrically (see FIG. 10).

FIG. 11 shows a state in which the outer casing 201 has been inserted until the inner per periphery of the outer casing 201 is in complete contact with the outer peripheries of the respective split cores 6.

(Explanation of FIG. 9)

Next, the temporarily holding jigs 9 and 10 are removed. By this, the in-slot conductor portions 11 are completely accommodated in the slots.

This completes the stator assembling.

(Further Explanations of the Insulator Inserting Step and the Conductor Holder Inserting Step)

The assembling step of the insulators 3 shown in FIG. 3, and the assembling step of the conductor holders 5 shown in FIG. 5 are explained in further detail with reference to FIG. 13.

Reference number 110 denotes an insulator holding drum. The insulator holding drum 110 is provided with long grooves 111 to hold the insulators 3 at intervals of 90 degrees at its outer periphery. The drum-like holder supporting member 2 is fitted with the distributed winding coil 1, the radially inner ends of the respective in-slot conductor portions 11 of the distributed winding coil 1 being in contact with the outer periphery of the holder supporting member 2. The holder supporting member 2 is recessed with the guide grooves 20 in the axial and radial directions. As seen from FIG. 13, the guide grooves 20 are recessed circumferentially adjoining the in-slot conductor portions 11 of the distributed winding coil 1.

The insulator holding drum 111 rotates steppingly counterclockwise in steps of 90 degrees, and each time it stops, the insulator 3 is inserted into the upper long groove 111, and the insulator 3 is pushed out from the lower long groove 111 to be caused to cover the in-slot portion 11. The holder supporting member 2 rotates steppingly clockwise in steps of one slot pitch of the in-slot conductor portions in synchronization with each 90-degree rotation of the insulator supporting drum 110.

Although omitted from illustration in FIG. 13, a conductor holder supporting drum having the similar structure as the insulator holding drum 110 is provided. This conductor holder supporting drum is provided with long grooves to holder the conductor holders 5 at intervals of 90 degrees at its outer periphery. Also this conductor holder supporting drum rotates steppingly counterclockwise in steps of 90 degrees, and each time it stops, the conductor holder 5 is inserted into the upper long groove, and the conductor holder 5 is pushed out from the lower long groove. By this, the conductor holder 5 moves to the centripetal direction along both ends of the in-slot conductor portion 11, and its front end portion is inserted into the guide groove 20 of the holder supporting member 2. Incidentally, FIG. 13 is a schematic drawing, and the guide groove 20 is formed further deep so that the conductor holder 5 can move to the centripetal direction.

Actually, the conductor holder 5 is constituted of conductor guide planks 50 disposed in parallel to each other.

The conductor guide planks 50 are constituted of flat plate-like members that move to the centripetal direction while respectively contacting the end surfaces on both circumferential sides of the in-slot conductor portion 11. In FIG. 13, the chain lines L radially described show lines each passing a circumferential center of a gap between the conductor guide planks 50. By this, the circumferential centers of the respective in-slot conductor portions 11 are defined correctly by the conductor guide planks 50. The movement to the centripetal direction of the conductor holder 5 constituted of the conductor guide planks 50, and the inserting step of the holder supporting member 2 into the guide grooves 20 are shown in FIG. 14 in further detail. The pair of the conductor guide planks 50 constituting the conductor holder 5 move at the position of A to the centripetal direction along the in-slot conductor portion 11 and are inserted into the guide grooves 20 of the holder supporting member 2. Since the holder supporting member 2 rotates steppingly clockwise, the radially outer ends of the conductor guide planks 50 having been completed to be inserted have nearly the same circumferential position as the radially outer end of the in-slot conductor portion 11.

(Further Explanation of the Inserting Step of the Split Cores 6)

The assembling step of the split cores 6 shown in FIGS. 7 to 12 is explained in further detail with reference to FIGS. 15 to 17.

In FIG. 15, the split core 6 is a soft magnetic member constituted of two teeth 61 radially extending across from the slot 60, and a back yoke portion 62 connecting the radially outer end portions of these two teeth 61 in the circumferential direction. The split cores 6 are provided by half the number of the slots 60 of the stator core. The core alignment plank 7 is accommodated in the slot 60.

The split core 6 is set at a predetermined circumferential position by the core alignment plank 7. By this, the circumferential center position of the slot 60 coincides with the circumferential middle position of the circumferential gap between the pair of the conductor guide planks 50 constituting the conductor holder 5. The slot 60 is an open slot. The circumferential width of the slot 60 is formed slightly smaller than the circumferential width of the circumferential gap between the pair of the conductor guide planks 50 and 50. In other words, the circumferential width of the in-slot conductor portion 11 is formed slightly smaller than the circumferential width of the slot 60.

Next, the core inserting jigs 8 urge the respective split cores 6 to the centripetal direction. The front ends of the teeth 61 contacts the front end of the conductor guide planks 50. Further, when the core inserting jigs 8 are urged to the centripetal direction, the conductor guide planks 50 are pushed into the guide grooves 20, and the in-slot conductor portions 11 are accommodated in the slots 60 as shown in FIG. 16. Thereafter, the core-aligning planks 7 are extracted from the slots 60, and the core inserting jigs 8 are moved to the centripetal direction to push the split cores 6 to the centripetal direction. By this, the respective in-slot conductor portions 11 are completely inserted into the slots 60, and the conductor guide planks 50 are inserted into the guide grooves 20 nearly completely (see FIG. 17).

Embodiment 2

Embodiment 2 is explained with reference to FIGS. 18 to 21. FIG. 18 shows the step shown in FIG. 14, FIG. 19 shows the step shown in FIG. 15, FIG. 20 shows the step shown in FIG. 16, and FIG. 21 shows the step shown in FIG. 17.

This Embodiment is characterized in that only the circumferentially odd numbered in-slot conductor portions 11 in Embodiment 1 shown in FIGS. 14 to 17 are held by the conductor guide planks 50, and the conductor guide planks 50 holding the circumferentially even numbered in-slot conductor portions 11 in Embodiment 1 are omitted. Doing so makes it possible to simplify the structure of the assembling apparatus, other than to increase the thickness of the conductor guide plank 50.

That is, in this embodiment, circumferentially even numbered conductor holders 5 are omitted. This is because since the circumferentially even numbered conductor holders 5 need not to be inserted into the slots 60 of the split cores 6, some positional variation along the circumferential direction can be tolerated.

Embodiment 3

Embodiment 3 is explained with reference to FIG. 23. In Embodiments 1 and 2, the axial length of the conductor guide plank 50 is made nearly equal to the axial length of the in-slot conductor portion 11. The axial length of the conductor guide plank 500 of this Embodiment 3 is greatly narrowed with respect to that of the in-slot conductor portions 11, and a pair of the conductor guide planks 500 are disposed being apart from each other in the axial direction at the same circumferential position. By this, the conductor guide plank 500 can be made compact in size. This is because since the in-slot conductor portion 11 has rigidity, if its circumferential position is defined at a predetermined circumferential position, the circumferential positions of other parts can be defined.

The invention claimed is:

1. A method of assembling a split core type stator comprising:
   a coil preparing step of preparing a stator coil made of a distributed winding coil in which a number of in-slot conductor portions to be accommodated in slots of a stator are arranged at a predetermined circumferential pitch at a position of a predetermined radial distance from an axis center;
   a split core disposing step of radially disposing a number of split cores each having at least one slot radially outside the respective in-slot conductor portions of the stator coil;
   a teeth inserting step of inserting teeth of the split cores between each adjacent in-slot conductor portions by moving a number of the split cores to a centripetal direction; and
   a split core joining step of joining a number of the split cores to constitute a stator core;
   wherein the teeth inserting step includes a step of supporting the in-slot conductor portions movable relatively in a radial direction by a plurality of conductor holders displaceable in the radial direction before the split cores are moved to the centripetal direction, while holding a plurality of the in-slot conductor portions at their respective target circumferential slot positions, and then moving the plurality of the conductor holders to the centripetal direction in conjunction with movement of the split cores to the centripetal direction.

2. The method of assembling a split core type stator according to claim 1, wherein the split core includes two teeth facing to each other across one slot, and a back yoke portion magnetically connecting the two teeth.

3. The method of assembling a split core type stator of an inner rotor type rotary electric machine according to claim 1, wherein the conductor holders hold a circumferential width of the in-slot conductor portions below a circumferential width of the split cores at the target circumferential slot positions.

4. The method of assembling a split core type stator of an inner rotor type rotary electric machine according to claim 3, wherein there are prepared in advance the conductor holders by a pair of conductor guide planks being apart from each other by nearly a slot width and extending in substantially the radial direction, and a drum-like holder supporting member having guide grooves to retractably hold the pair of the conductor guide planks constituting the plurality of the conductor holders at an outer periphery portion, the coil preparing step including a step to set the stator coil at the outer periphery portion of the holder supporting member, and to interpose the in-slot conductor portions between each pair of the conductor guide planks.

5. The method of assembling a split core type stator according to claim 1, wherein the conductor holders regulate circumferential positions of the circumferentially odd numbered in-slot conductor portions of the stator coil, and do not regulate circumferential positions of the circumferentially even numbered in-slot conductor portions of the stator coil.

6. The method of assembling a split core type stator according to claim 1, wherein an axial length of the conductor holders is made shorter than an axial length of the in-slot conductor portions of the stator coil.

* * * * *